United States Patent
Yamazaki et al.

(10) Patent No.: US 10,411,564 B2
(45) Date of Patent: Sep. 10, 2019

(54) ROBOT WITH A FLEXIBLE BOARD HAVING REDUCED NOISE LEAKAGE

(71) Applicant: Seiko Epson Corporation, Tokyo (JP)

(72) Inventors: Takema Yamazaki, Fujimi (JP); Izumi Iida, Shiojiri (JP); Shigenori Sasai, Azumino (JP)

(73) Assignee: Seiko Epson Corporation (JP)

( * ) Notice: Subject to any disclaimer, the term of this patent is extended or adjusted under 35 U.S.C. 154(b) by 295 days.

(21) Appl. No.: 14/918,701

(22) Filed: Oct. 21, 2015

(65) Prior Publication Data

US 2016/0118866 A1  Apr. 28, 2016

(30) Foreign Application Priority Data

Oct. 22, 2014 (JP) .................. 2014-215125

(51) Int. Cl.
| | |
|---|---|
| *H02K 11/02* | (2016.01) |
| *B25J 19/00* | (2006.01) |
| *H02M 1/12* | (2006.01) |
| *H02P 27/08* | (2006.01) |
| *H02M 5/458* | (2006.01) |

(52) U.S. Cl.
CPC ........ *H02K 11/024* (2013.01); *B25J 19/0029* (2013.01); *H02M 1/126* (2013.01); *H02M 5/458* (2013.01); *H02P 27/08* (2013.01)

(58) Field of Classification Search
CPC ... H02K 11/024; B25J 19/0029; H02M 1/126; H02M 5/458; H02P 27/08
USPC ..................................................... 310/71, 72
See application file for complete search history.

(56) References Cited

U.S. PATENT DOCUMENTS

| | | | |
|---|---|---|---|
| 8,174,810 B2 * | 5/2012 | Tallam .................. | H02M 1/126 333/25 |
| 9,621,094 B2 * | 4/2017 | Vrankovic ............. | H02P 23/28 |
| 2005/0174812 A1 * | 8/2005 | Wu ....................... | H02M 5/458 363/39 |
| 2007/0278988 A1 * | 12/2007 | De .......................... | H02P 27/08 318/801 |
| 2009/0251000 A1 * | 10/2009 | Su ....................... | B60L 11/1887 307/9.1 |
| 2014/0137685 A1 * | 5/2014 | Iwayama ................ | B25J 18/00 74/490.02 |
| 2014/0290415 A1 * | 10/2014 | Hasuo .................. | B25J 19/0025 74/490.02 |
| 2015/0292909 A1 * | 10/2015 | Jonsson ................ | G01D 5/204 324/207.15 |
| 2016/0173012 A1 * | 6/2016 | Nondahl .................. | H02P 6/08 318/400.34 |
| 2017/0239822 A1 * | 8/2017 | Sakata ..................... | B25J 9/123 |

(Continued)

FOREIGN PATENT DOCUMENTS

| | | |
|---|---|---|
| CN | 1725610 A | 1/2006 |
| JP | 63-257470 A | 10/1988 |

(Continued)

*Primary Examiner* — Julio C. Gonzalez
*Assistant Examiner* — Rashad H Johnson
(74) *Attorney, Agent, or Firm* — Harness, Dickey & Pierce, P.L.C.

(57) ABSTRACT

A robot includes a driving unit, a flexible board including a power line that transmits electric power to the driving unit, and a choke coil connected to the power line. A band rejection filter is formed by parasitic capacitance, which is formed by the electric line, and the choke coil.

7 Claims, 2 Drawing Sheets

(56) References Cited

U.S. PATENT DOCUMENTS

| | | | |
|---|---|---|---|
| 2018/0154528 A1* | 6/2018 | Saitou | B25J 18/00 |
| 2018/0236671 A1* | 8/2018 | Yoshimura | B25J 19/0075 |

FOREIGN PATENT DOCUMENTS

| | | | |
|---|---|---|---|
| JP | 06-292369 A | 10/1994 | |
| JP | H07-066519 A | 3/1995 | |
| JP | 09-205799 A | 8/1997 | |
| JP | 2005-130575 A | 5/2005 | |
| JP | 2009-125887 A | 6/2009 | |
| JP | 2010-214530 A | 9/2010 | |
| JP | 2013-193151 A | 9/2013 | |

* cited by examiner

ROBOT WITH A FLEXIBLE BOARD HAVING REDUCED NOISE LEAKAGE

BACKGROUND

1. Technical Field

The present invention relates to a robot.

2. Related Art

There has been known a configuration for supplying, via a power line, electric power to a driving unit included in a robot and driving, with the electric power, a motor or the like included in the driving unit to drive the driving unit. For example, JP-A-2010-214530 (Patent Literature 1) discloses a robot that supplies electric power to an actuator through a power line formed on a flexible board.

When a wire is formed using the flexible board as in the related art, parasitic capacitance increases and noise increases. That is, in the configuration in which the flexible board is used, metal conductors (e.g., a ground line and a shield) serving as ground potential and a frame and the like of a robot serving as ground potential are disposed on the flexible board or around the flexible board. Therefore, in a circuit wire in which high-frequency noise could be transmitted by a power line, the flexible board is parasitic capacitance that transmits noise.

SUMMARY

An advantage of some aspects of the invention is to provide a technique capable of suppressing a leak of noise to the outside of a flexible board.

A robot according to an aspect of the invention includes a driving unit, a flexible board including a power line that transmits electric power to the driving unit, and a choke coil connected to the power line. A band rejection filter is formed by parasitic capacitance, which is formed by the electric line, and the choke coil.

In the robot in which the electric line formed on the flexible board is connected to the circuit provided in the driving unit, parasitic capacitance is inevitably caused because the flexible board is used. On the other hand, the band rejection filter can be formed if a capacitance component and an inductance component are used. Therefore, in the robot according to the aspect of the invention, the band rejection filter is configured by the parasitic capacitance and the choke coil.

When the band rejection filter is configured in this way, for example, noise transmitted to the band rejection filter is attenuated or reflected by the band rejection filter. Therefore, noise leaking to the outside of the flexible board through the parasitic capacitance if the band rejection filter is absent can be prevented from leaking to the outside of the flexible board. Note that a space around the flexible board and a structure and the like (a frame and the like of the robot) around the flexible board are assumed as the outside of the flexible board.

The driving unit is a part configuring the robot and is a part driven by electric power. The driving unit only has to be driven by operating a motor and various motion parts such as an actuator with electric power. The number of driving units and the shape, the moving direction, and the like of the driving unit are not limited. Note that the driving unit only has to be configured to be capable of supplying, through the flexible board, electric power to the motion parts included in the driving unit. A space through which the flexible board passes may be formed in a housing of the driving unit. At least a part of the flexible board may be configured to pass outside the housing of the driving unit.

In the flexible board, it is sufficient that at least the power line is formed on a substrate configured by a base material having flexibility. The power line only has to be configured in rating and a number corresponding to electric power necessary in the driving unit. Therefore, if the driving unit includes a motion part such as a motor driven by a polyphase alternating current, a plurality of the power lines for transmitting electric powers in respective phases are formed on the flexible board. Note that the flexible board only has to have flexibility such that stress due to the driving of the driving unit does not break the substrate or a wire on the substrate. The material and the shape of the flexible board are not limited. Naturally, a plurality of substrates may be used as a set and a shield or the like formed by a metal conductor or the like may be formed in at least a part of the substrates.

The choke coil only has to be an inductance component connected to the power line. The size, the shape, the number of turns, and the like of the choke coil are not limited. The band rejection filter only has to be formed at least in combination with parasitic capacitance formed by the power line of the flexible board. Therefore, the band rejection filter capable of removing noise having a rejection target frequency only has to be formed by adjusting the size, the shape, the number of turns, and the like of the choke coil on the basis of the size of the parasitic capacitance and the frequency of the noise that should be rejected. Naturally, the choke coil alone may function as a member for preventing high-frequency noise from being transmitted to the driving unit.

Note that the band rejection filter only has to be formed by at least the choke coil and the parasitic capacitance. For example, by forming an LC filter that allows a low-frequency band to pass and interrupts a high-frequency band with the choke coil and the parasitic capacitance, it is possible to adopt, for example, a configuration for removing noise in the high-frequency band. In this case, it is desirable to design a choke coil such that a cutoff frequency in the LC filter is smaller than a rejection target frequency (e.g., a peak frequency of switching noise). With this configuration, it is possible to form the band rejection filter capable of removing noise having the rejection target frequency. Naturally, the band rejection filter may be formed in combination with other components, for example, a resistor component and a capacitor component.

As the parasitic capacitance, capacitances formed by various factors are assumed. For example, it is possible to assume parasitic capacitance formed by disposing a metal conductor and the like around the power line of the flexible board. That is, in a configuration in which the flexible board includes the power line and a metal conductor and further includes an insulator present between the power line and the metal conductor, a capacitor in which the power line and the metal conductor hold the insulator is formed. Therefore, the parasitic capacitance is formed by the power line. Note that various conductors are assumed as the metal conductor. A wire and the like serving as a shield and ground potential are assumed.

The former is a metal conductor disposed to cover at least a shield target wire. It is possible to adopt, for example, a configuration in which flexible boards are formed in layers respectively including the power line, the metal conductor, and the insulator in a multilayer flexible board. The latter wire may be configured by forming the metal conductor as one layer of the multilayer flexible board. A wire serving as ground potential may be disposed side by side with the power line in the layer including the power line. In any case, with the configuration explained above, it is possible to suppress a leak of noise due to parasitic capacitance that is inevitably caused because the flexible board including the metal conductor is used.

Naturally, the parasitic capacitance involved in the use of the flexible board could be caused by other factors. For example, parasitic capacitance is assumed that is formed because the flexible board is placed near members (a housing, other circuits, etc.) on the inside of the driving unit when the flexible board is disposed in an internal space of the driving unit. Therefore, the band rejection filter may be formed by adjusting the choke coil to suppress a leak of noise due to such parasitic capacitance. Note that a capacitance value of the parasitic capacitance can be specified by, for example, a simulation during design of the flexible board, the driving unit, the robot and the like or actual measurement after manufacturing of the flexible board, the driving unit, the robot, and the like.

Further, the choke coil may be connected in series between a generation source of the polyphase alternating current and the power line of the flexible board. That is, in a configuration in which electric power generated by the generation source of the polyphase alternating current is transmitted to the motor or the like in the driving unit by the power line of the flexible board, when the choke coil is connected in series between the generation source of the polyphase alternating current and the power line of the flexible board, an LC filter functioning as the band rejection filter is formed by the parasitic capacitance of the flexible board and the choke coil. More specifically, in a state in which the choke coil is connected in series between the generation source of the polyphase alternating current and the power line of the flexible board, when the parasitic capacitance formed by the power line of the flexible board is regarded as a capacitor, one end of the capacitor can be regarded as being connected to a wire between the choke coil and the motor or the like and the other end of the capacitor can be regarded as being connected to the ground.

Therefore, a typical LC filter can be formed by the choke coil and the parasitic capacitance. The band rejection filter can be formed by simply connecting the choke coil in series between the generation source of the polyphase alternating current and the power line of the flexible board. The band rejection filter can be formed without preparing a capacitor. Note that the generation source of the polyphase alternating current only has to be a circuit that generates alternating-current powers in respective phases. The generation source can be configured by, for example, an inverter circuit that generates alternating-current power from direct-current power through control on a switching element.

Further, in a configuration in which the generation source of the polyphase alternating current includes a power converting unit that converts electric power with a switching element, the band rejection filter may be configured to reject a band including a peak frequency of switching noise in the power converting unit. That is, in a configuration in which the polyphase alternating current is generated by the inverter circuit or the like that generates alternating-current power from direct-current power through control on the switching element, high-frequency switching noise is caused according to high-speed switching control performed on the switched element. Therefore, if the specifications of the choke coil are adjusted such that characteristics of the band rejection filter formed by the choke coil and the parasitic capacitance are characteristics for rejecting a band including the peak frequency of the switching noise, it is possible to remove the switching noise (suppress a leak of noise to the outside of the flexible board) with a simple configuration.

Further, the choke coil and the power converting unit may be mounted on the same substrate. With this configuration, compared with a configuration in which the choke coil is mounted on the flexible board or a configuration in which the choke coil is inserted between the flexible board and the driving unit, the choke coil can be disposed near the power converting unit. It is possible to effectively suppress the switching noise.

Further, the technique of the invention for forming the band rejection filter with the parasitic capacitance, which is formed by the power line of the flexible board, and the choke coil explained above is also applicable as a method. The robot applied with the invention may be provided as a robot system including a control unit or the like that performs control of the robot and association with various devices. It is possible to adopt various configurations.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained according to order described below.

Figure 1A:
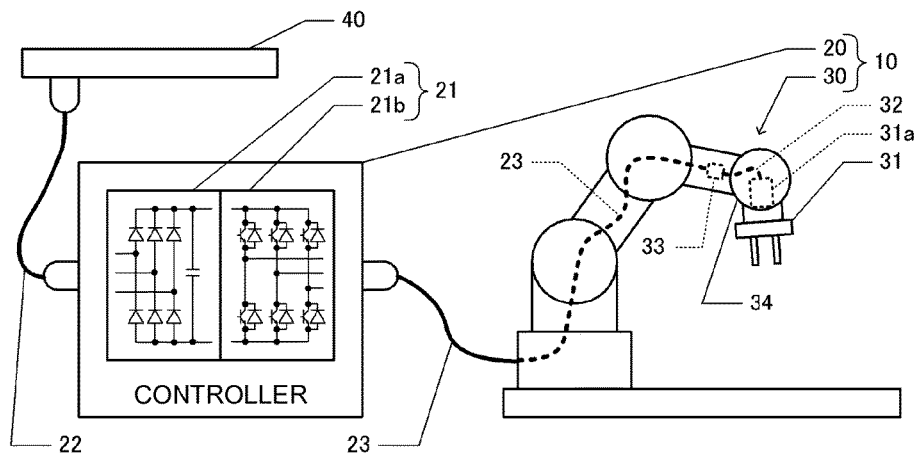
FIG. 1A is a block diagram showing a robot according to an embodiment of the invention.

(1) Configuration of robot
(2) Configuration for noise removal
(3) Other embodiments (1) Configuration of Robot FIG. 1A is a block diagram showing the configuration of a robot 10 according to an embodiment of the invention. The robot 10 according to this embodiment includes a controller 20 and a driving unit 30. The controller 20 includes various circuits for driving the driving unit 30. A cable 22 is connected to the controller 20. Electric power is supplied to the controller 20 from a power supply 40, which is provided in a setting place of the robot 10, via the cable 22.

The controller 20 includes a power converting unit 21. The power converting unit 21 includes a circuit that generates electric power that should be supplied from the power supply 40, which is provided in specific standards (a voltage, a frequency, etc.), to the driving unit 30. In this embodiment, the power supply 40 provides a three-phase alternating current having a predetermined voltage and a predetermined frequency. The power converting unit 21 generates, from the three-phase alternating current, a three-phase alternating current that should be supplied to the driving unit 30.

Therefore, the power converting unit 21 includes a converter 21a that converts alternating-current power to direct-current power and an inverter 21b that converts direct-current power to alternating-current power. The converter 21a is a circuit that converts electric powers in respective phases of the power supply 40 into direct-current powers. The inverter 21b includes a plurality of switching elements. The inverter 21b performs PWM control using the switching elements to convert the direct-current power generated by the converter 21a into three-phase alternating-current powers in different phases.

The alternating-current powers in the respective phases generated by the inverter 21b are supplied to the driving unit 30 via a cable 23 formed by a coated wire. Note that, in this embodiment, the three-phase alternating-current powers generated by the inverter 21b are electric powers for driving a motor 31a, which is an alternating-current electric motor. That is, the motor 31a is provided on the inside of the driving unit 30. Electric power to be supplied to the motor 31a is generated by the inverter 21b.

The driving unit 30 includes a plurality of movable units driven by a plurality of motors. In FIG. 1A, the motor 31a that drives an end effector 31 functioning as a movable unit included in the driving unit 30 is shown. The other movable units such as a rotatably supported arm are also driven by the other motors. In FIG. 1A, the other motors are not shown. Note that it is assumed that the robot 10 according to this embodiment coexists with a human during operation. For example, it is assumed that the robot 10 is disposed in a living space of the human or the robot 10 performs work together with the human in a factory. Therefore, the capacity of the motor 31a in this embodiment is set to approximately 80 W, which is extremely small compared with the capacity (e.g., 1 kW) of a motor in an industrial robot (a robot that does not coexist with a human during operation).

A flexible board 32 is connected to the motor 31a. The flexible board 32 is connected to the cable 23 via a relay 33. That is, the cable 23 is wired from an opening formed in the driving unit 30 (in the example shown in FIG. 1A, the opening is formed in a base) to the inside of the driving unit 30. The cable 23 is connected to the flexible board 32, which is connected to the motor 31a disposed on the inside of the driving unit 30, via the relay 33.

Note that the cable 23 includes power lines for transmitting the three-phase alternating-current powers for driving the motor 31a, which is the alternating-current electric motor, and a ground line serving as ground potential (a metal conductor serving as the ground potential). The flexible board 32 includes a plurality of layers. The three-phase power lines and the ground line are formed by a metal conductor in one film-like layer containing polyimide or the like as a base material. In this embodiment, layers having a metal conductor for shield are disposed in the front and the back of the layer including the power lines and the ground line. Naturally, the metal conductor for shield and the metal conductor forming the power lines (the ground line) are insulated from each other. The insulation can be realized by a layer or the like formed by an insulator.

The flexible board 32 is thin and light and is advantageous for wiring in a narrow space. Therefore, in this embodiment, the flexible board 32 is used for wiring in a space between the motor 31a and the relay 33. That is, an arm of the robot 10 shown in FIG. 1A becomes thinner as the arm is closer to the end effector 31 on the distal end side. A space around the motor 31a is an extremely narrow space. Therefore, the flexible board 32 is used rather than the coated wire in the narrow space between the motor 31a and the relay 33.

On the other hand, in this embodiment, a space between the relay 33 and the controller 20 is wider than the space between the motor 31a and the relay 33. Even if wiring is performed using the cable 23, which is the coated wire, in the space, the wiring is not difficult. Therefore, in this embodiment, wiring between the motor 31a and the relay 33 is realized by the flexible board 32 at the distal end of the cable 23. Naturally, if there is a part where wiring by the coated wire is difficult, for example, when an internal space between the relay 33 and the controller 20 is narrow, a wire in the part may be a flexible board.

(2) Configuration for Noise Removal

In any case, in this embodiment, a wire in at least one place on the inside of the driving unit 30 is formed by the flexible board 32. As explained above, the flexible board 32 is used for facilitation of wiring in a narrow space. However, in the flexible board 32, formation of parasitic capacitance is unavoidable. In the inverter 21b of the controller 20, since a large number of switching elements repeat ON/OFF operation at high speed, high-frequency switching noise occurs. In driving of the general motor 31a, the frequency of the switching noise is in a several MHz region. Typically, a peak frequency of noise is several MHz (e.g., 5 MHz). The noise is gradually attenuated in a frequency region higher than the peak frequency.

Figure 2:
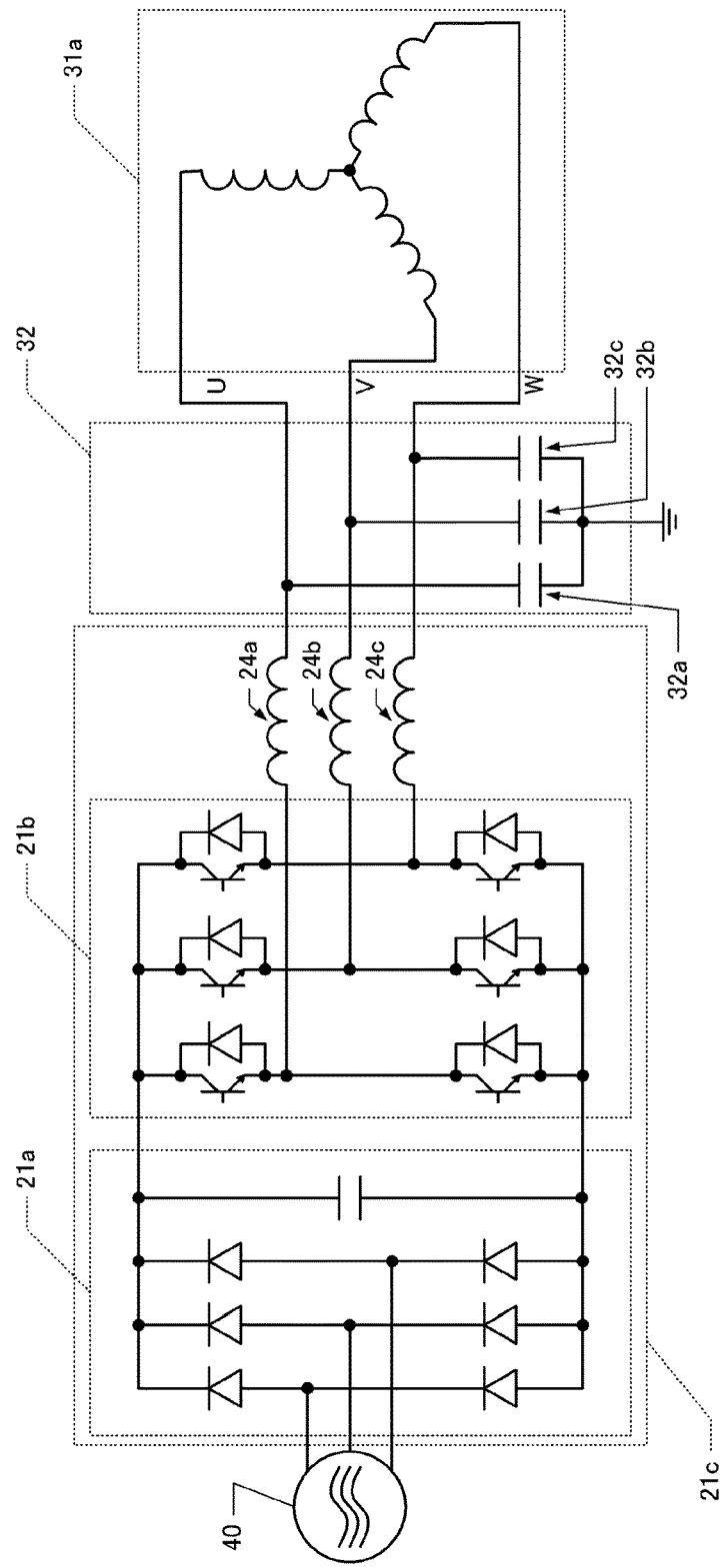
FIG. 2 is a diagram showing a circuit including a band rejection filter.

Therefore, in this embodiment, a band rejection filter that prevents a leak of noise to the outside of the flexible board 32 is formed by parasitic capacitances, which are formed by the power lines of the flexible board 32, and choke coils. FIG. 2 is a diagram schematically showing a circuit formed by a power converting unit 21 (the converter 21a and the inverter 21b), the flexible board 32, and the motor 31a. Elements related to removal of noise are shown (the cable 23 and the like not used for explanation of removal of noise are not shown).

As shown in the figure, the power supply 40 is connected to the converter 21a and supplies three-phase alternating-current powers to the converter 21a. The converter 21a is connected to the inverter 21b. The converter 21a rectifies the three-phase alternating-current powers into direct-current powers and supplies the direct-current powers to the inverter 21b. In the inverter 21b, a control IC included in the power converting unit 21 controls the switching elements in the respective phases and causes the switching elements to perform switching operation at a predetermined frequency to thereby generate an alternating-current voltage having a predetermined frequency and predetermined amplitude.

Choke coils 24a, 24b, and 24c are respectively connected to output lines in the respective phases of the inverter 21b. Power lines respectively extending from the choke coils 24a, 24b, and 24c reach the flexible board 32 through the cable 23 and further reach the motor 31a from the flexible board 32. Therefore, with the configuration explained above, the motor 31a rotates at a predetermined cycle according to the control of the switching elements by the control IC. The controller 20 executes control conforming to a not-shown computer program (control executed by firmware of the controller 20 or another computer) and causes the driving unit 30 of the robot 10 to execute a predetermined operation.

In the configuration explained above, the metal conductor is disposed around the power lines in the respective phases formed by the flexible board 32. Parasitic capacitances are formed by the power lines. Such parasitic capacitance can be regarded as a capacitor connected between the power lines in the respective phases and the metal conductor. In this embodiment, since the metal conductor is a wire of the ground potential such as the ground wire, the parasitic capacitances are shown in FIG. 2 as parasitic capacitances 32a, 32b, and 32c between the power lines and the ground potential. In a state in which the parasitic capacitances 32a, 32b, and 32c are formed, when the choke coils 24a, 24b, and 24c are absent, switching noise that occurs in the inverter 21b leaks to the outside (a ground wire) via the parasitic capacitances 32a, 32b, and 32c. As an example of the parasitic capacitances 32a, 32b, and 32c, parasitic capacitance of approximately several hundred pF (200 pF, etc.) is assumed.

However, in this embodiment, as shown in FIG. 2, the choke coils 24a, 24b, and 24c respectively connected in series between the inverter 21b, which is the generation source of the polyphase alternating current, and the power lines of the flexible board 32. Therefore, in respective layers, the choke coils and the parasitic capacitances form LC filters that remove signals in a high-frequency band.

Figure 1B:
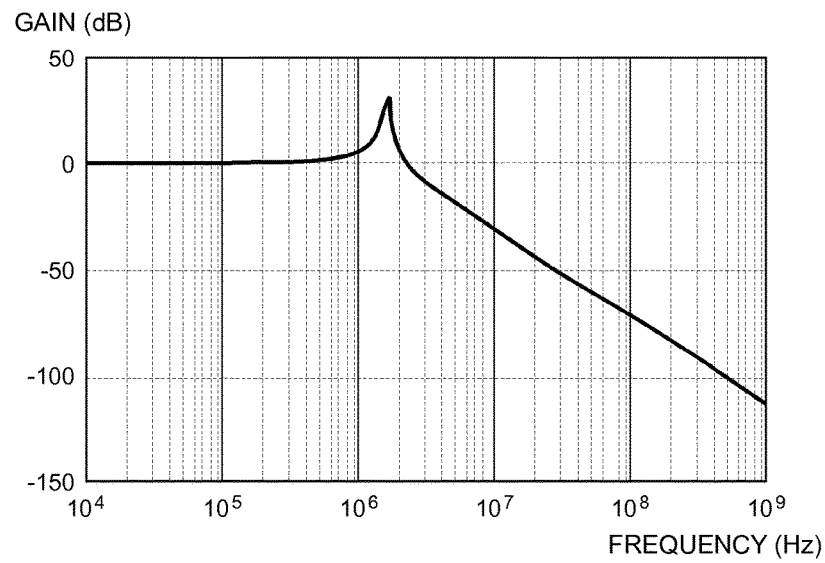
FIG. 1B is a diagram showing a frequency characteristic of a gain of an LC filter.
Figure 1C:
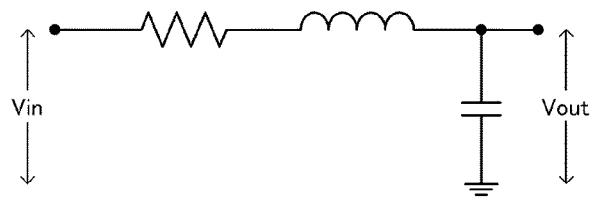
FIG. 1C is an explanatory diagram for explaining a circuit of the LC filter.

FIGS. 1B and 1C are explanatory diagrams for explaining action by the LC filters shown in FIG. 2. As shown in FIG. 1C, a circuit is assumed in which a resistance element and a coil are connected in series, one end of a capacitor is connected to a terminal on the coil side, and the other end of the capacitor is grounded. It is assumed that the circuit includes a filter, an input voltage Vin of which is a voltage applied to a terminal on the resistance element side and an output voltage Vout of which is a voltage across both ends of the capacitor. In the circuit, if a resistance value of the resistance element R is set small with respect to the impedance of the capacitor, the circuit shown in FIG. 1C is a filter equivalent to the LC filters shown in FIG. 2.

FIG. 1B shows a frequency characteristic of a gain obtained when the resistance value is set to 0.1Ω, the capacity of the capacitor is set to 200 pF, and the inductance of the coil is set to 47 μH in the circuit shown in FIG. 1C. As shown in FIG. 1B, in the circuit shown in FIG. 1C, the gain starts to increase near 1 MHz, reaches the peak at a frequency of 2 MHz or less, and thereafter suddenly decreases. In this example, a cutoff frequency at which the gain decreases to −3 dB is present between 2 MHz and 3 MHz. Therefore, the circuit shown in FIG. 1C can be regarded as functioning as a band rejection filter that inhibits a frequency higher than the cutoff frequency present between 2 MHz and 3 MHz.

In this way, with the LC filters formed by combining the choke coils 24a, 24b, and 24c and the parasitic capacitances 32a, 32b, and 32c shown in FIG. 2, switching noise that occurs on the inverter 21b side, which is the input side, is attenuated or reflected by the LC filters. Therefore, it is possible to suppress the switching noise from being transmitted further to the output side than the LC filters. It is possible to suppress a leak of noise to the outside of the flexible board.

Note that the choke coils 24a, 24b, and 24c can be designed using the frequency of the switching noise and the parasitic capacitances 32a, 32b, and 32c. For example, a parasitic capacitance value by the flexible board 32 in a state in which the choke coils 24a, 24b, and 24c are removed from the circuit shown in FIG. 2 is specified by a simulation, actual measurement, or the like. A frequency characteristic of the switching noise in the inverter 21b is specified by a simulation, actual measurement, or the like.

In general, switching noise reaches the peak at a specific frequency. The intensity of the noise does not greatly change in a frequency region lower than the peak frequency. The noise is gradually attenuated in a frequency region higher than the peak frequency. Therefore, if the choke coils 24a, 24b, and 24c are designed to set the cutoff frequency of the LC filters lower than the peak frequency, it is possible to form a band rejection filter that removes a leak of the switching noise. For example, when the parasitic capacitance value by the flexible board 32 is approximately 200 pF and the peak frequency of the switching noise is 5 MHz, as shown in FIG. 1B, if the inductance of the choke coils 24a, 24b, and 24c is set to 47 μH, it is possible to form a band rejection filter that removes the switching noise.

Note that, in the band rejection filter according to this embodiment, at least the peak frequency of the removal target switching noise only has to be higher than the cutoff frequency of the band rejection filter. However, as the peak frequency of the switching noise and the cutoff frequency are further apart, a noise removal effect of the band rejection filter with respect to the switching noise is higher. Therefore, the band rejection filter may be formed to further increase the noise removal effect by adjusting the inductance of the choke coils 24a, 24b, and 24c.

In order to increase the difference between the peak frequency of the switching noise and the cutoff frequency, for example, the choke coils 24a, 24b, and 24c only have to be configured by coils having large inductance. However, it is undesirable to excessively increase the inductance of the coils because the scale of the coils increases and costs, the size, and the weight of the coils increase. Therefore, it is desirable to set the magnitude of the inductance in a range in which the removal target switching noise can be sufficiently suppressed and not to excessively increase the inductance. For example, in this embodiment in which the motor 31a having the capacity of 80 W, which is the motor having a small capacity, is used as explained above, in a situation in which the parasitic capacitance value by the flexible board 32 is approximately 200 pF and the peak frequency of the switching noise is approximately 5 MHz, it is reasonable selection to adopt coils having the inductance of 47 mH.

Note that, as the coil having the inductance of 47 mH, a component that can be surface-mounted on a printed board can be selected (e.g., an SRR1806 series of Bourns, Inc. (registered trademark)). Therefore, compared with a configuration in which coils obtained by winding power lines in three phases on a common ferrite core (a common mode noise filter in the past) is used as a choke coil, it is possible to remove the switching noise using the choke coils that are extremely small in a scale (small in size, light in weight, and low in costs).

In this embodiment, in this way, rather than forming the common mode noise filter with the large coil, a small noise filter is formed by forming normal mode noise filters with LC filters in the power lines in the respective phases, whereby a noise filter having a small scale is formed. However, since the band rejection filter that rejects a peak frequency is formed focusing on the peak frequency of the switching noise, it is possible to effectively remove the switching noise even if the noise filter is small in size.

Note that, as in this embodiment, in the motor 31a having the capacity of approximately 80 W, an instantaneous maximum current is approximately 3 A. With the maximum current in this degree, it is possible to select a choke coil having the maximum current within a rated current out of surface-mountable choke coils. Further, a rated current of the choke coils 24a, 24b, and 24c is desirably equal to or larger than a rated current of the flexible board 32. With this configuration, the choke coils 24a, 24b, and 24c can be designed such that an electric current within an assumed range in a circuit in which the flexible board 32 is used always flows to the choke coils 24a, 24b, and 24c and the choke coils 24a, 24b, and 24c are not broken by the electric current.

In this embodiment, the converter 21a and the inverter 21b configuring the power converting unit 21 and the choke coils 24a, 24b, and 24c are formed on the same substrate. In FIG. 2, the substrate on which these circuits are formed is schematically indicated by a reference sign 21c. In a configuration in which the inverter 21b and the choke coils 24a, 24b, and 24c are formed on the same substrate, the choke coils 24a, 24b, and 24c can be disposed (mounted) near the inverter 21b. Therefore, it is possible to dispose the choke coils 24a, 24b, and 24c, which attenuate noise, near the inverter 21b, which is a source of occurrence of the switching noise. It is possible to efficiently suppress the switching noise.

In this embodiment, the switching noise is suppressed by the LC filters formed by the choke coils 24a, 24b, and 24c and the parasitic capacitances 32a, 32b, and 32c. Therefore, since the choke coils 24a, 24b, and 24c are mounted on the substrate 21c, compared with the configuration in which the choke coils 24a, 24b, and 24c are disposed in the driving unit 30 (e.g., near the flexible board 32), it is possible to effectively suppress a leak of the switching noise to the outside of the substrate 21c, in particular, intrusion of the switching noise into the driving unit 30.

(3) Other Embodiments

The embodiment explained above is an example for carrying out the invention. Other various embodiments can be adopted as long as the band rejection filter is formed by the parasitic capacitances formed by the power lines of the flexible board and the choke coils. For example, a form of the robot 10 is not limited to the form shown in FIG. 1A and may be any other robots such as a double-arm robot, a humanoid robot, a SCARA robot.

The motor 31a is the motor driven by a three-phase alternating current. However, the driving unit of the robot may be driven by other techniques. For example, the driving unit may be driven by a motor driven by a polyphase alternating current other than the three-phase alternating current or may be driven by a motion part (a solenoid, etc.) other than the motor. In any case, the flexible board only has to be connected to the motion part. The band rejection filter only has to be formed by the parasitic capacitances, which are formed by the flexible board, and the choke coils.

In the choke coils 24a, 24b, and 24c, various components may be provided other than the components explained above. For example, the choke coils 24a, 24b, and 24c may include magnetic shields. With this configuration, it is possible to suppress a leak of noise from the choke coils 24a, 24b, and 24c and intrusion of noise into the choke coils 24a, 24b, and 24c.

The entire disclosure of Japanese Patent Application No. 2014-215125, filed Oct. 22, 2014 is expressly incorporated by reference herein.

What is claimed is:

1. A robot comprising:
a plurality of arms that are serially connected to each other via a plurality of joints, the plurality of arms including a distal end arm that is located at a distal end of the plurality of arms;
a motor configured to drive the distal end arm, the motor being provided in the distal end arm;
a flexible board provided in one of the plurality of arms, the flexible board being connected to the motor, the flexible board including a board power line, a metal conductor, and an insulator, the board power line transmitting electric power to the motor so as to drive the distal end arm, the metal conductor having a ground potential, the insulator being provided between the board power line and the metal conductor;
a cable including a drive power line, the cable being connected to the flexible board via a relay, the cable being provided in the plurality of arms, the cable extending from a proximal end of the plurality of arms so that a cable end of the cable being spaced apart from the proximal end of the plurality of arms; and
a controller that is separately provided from the plurality of arms, the controller being configured with a power conversion circuit and a choke coil, the cable end being connected to the controller, the power conversion circuit converting the electric power by a switching element so as to transmit the electric power to the motor via the drive power line in the cable, the relay, and the board power line in the flexible board,
wherein a band rejection filter is formed by parasitic capacitance and the choke coil, and
the parasitic capacitance is formed by the board power line in the flexible board.

2. The robot according to claim 1, wherein
the motor is driven by a polyphase alternating current, and
the flexible board includes a plurality of the board power lines for transmitting electric powers in respective phases of the polyphase alternating current.

3. The robot according to claim 2, wherein
the choke coil is connected in series between a generation source for the polyphase alternating current and the board power line in the flexible board.

4. The robot according to claim 2, wherein
a generation source includes the power conversion circuit, and
the band rejection filter is configured to reject a band including a peak frequency of switching noise in the power conversion circuit.

5. The robot according to claim 1, wherein
the choke coil is a normal mode choke coil, and
the choke coil and the power conversion circuit are mounted on a same substrate.

6. The robot according to claim 1, further comprising:
a wire at the ground potential,
wherein the wire is disposed side by side with the board power line.

7. The robot according to claim 1,
wherein the cable is provided entirely inside all of the plurality of arms.

* * * * *